(12) United States Patent
Sekine (10) Patent No.: US 7,357,720 B2
(45) Date of Patent: Apr. 15, 2008

(54) CROSS JOINT

(75) Inventor: Hiroshi Sekine, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/540,516

(22) Filed: Oct. 2, 2006

(65) Prior Publication Data

US 2007/0026951 A1    Feb. 1, 2007

Related U.S. Application Data

(62) Division of application No. 10/002,012, filed on Dec. 5, 2001, now Pat. No. 7,118,484.

(30) Foreign Application Priority Data

| Dec. 6, 2000 | (JP) | ............................. 2000-371934 |
| Jul. 19, 2001 | (JP) | ............................. 2001-219935 |
| Oct. 11, 2001 | (JP) | ............................. 2001-313941 |
| Oct. 11, 2001 | (JP) | ............................. 2001-313945 |

(51) Int. Cl.
    *F16D 3/43* (2006.01)
(52) U.S. Cl. ....................... 464/14; 464/132
(58) Field of Classification Search ............ 464/11–14, 464/132, 136, 128; 384/127, 569, 587, 589
    See application file for complete search history.

(56) References Cited

U.S. PATENT DOCUMENTS

| 771,637 | A | * | 10/1904 | Hoffmann ................... 464/128 |
| 1,996,996 | A | * | 4/1935 | Harrison et al. ......... 464/128 X |
| 2,270,281 | A | | 1/1942 | Dunn |
| 3,138,942 | A | | 6/1964 | Kayser .................... 464/128 X |
| 3,200,615 | A | * | 8/1965 | Stokely ........................ 464/14 |
| 3,324,681 | A | | 6/1967 | Burns et al. ................ 464/130 |
| 3,651,663 | A | | 3/1972 | Lange et al. ................ 464/128 |
| 4,129,016 | A | | 12/1978 | Olson, Sr. |
| 4,144,724 | A | | 3/1979 | Armasow et al. |
| 4,472,157 | A | | 9/1984 | Sindelar ................. 464/136 X |
| 4,482,337 | A | | 11/1984 | Petrzelka ..................... 464/128 |
| 4,650,440 | A | | 3/1987 | Fisher ......................... 464/14 |
| 4,710,150 | A | | 12/1987 | Mangiavacchi .............. 464/14 |
| 4,932,923 | A | | 6/1990 | Thompson |
| 5,188,564 | A | | 2/1993 | Keller ......................... 464/14 |
| 5,284,395 | A | * | 2/1994 | Stemberger ............. 384/569 X |
| 6,334,714 | B1 | | 1/2002 | Harimoto et al. ........... 384/569 |

(Continued)

FOREIGN PATENT DOCUMENTS

DE    1 122 781    1/1962

(Continued)

OTHER PUBLICATIONS

Universal Joint and Driveshaft Design Manual, AE-7, The Society of Automotive Engineers, Inc., Warrendale, PA, pp. 71 & 72, TJ 1079.S62 1979.*

*Primary Examiner*—Greg Binda
(74) *Attorney, Agent, or Firm*—Miles & Stockbridge P.C.

(57) ABSTRACT

A cross joint comprises yokes each formed with a bearing hole and a spider shaft rotatably fitted into the bearing hole through a rolling bearing. The spider shaft is formed with a contact portion with the rolling bearing, the contact portion having its outside diameter larger than an outside diameter of the spider shaft.

21 Claims, 10 Drawing Sheets

U.S. PATENT DOCUMENTS

| | | |
|---|---|---|
| 7,101,285 B2 * | 9/2006 | Sekine .................. 464/14 |
| 2001/0007832 A1 | 7/2001 | Takabe .................. 464/15 |

FOREIGN PATENT DOCUMENTS

| | | |
|---|---|---|
| FR | 2 657 088 | 7/1991 |
| JP | U.M. 1-65929 | 4/1989 |
| JP | 2000-170755 | 6/2000 |
| JP | 2000-170786 | 6/2000 |
| JP | 2001-193753 | 7/2001 |

* cited by examiner

FIG. 14B

CROSS JOINT

CROSS-REFERENCE TO RELATED APPLICATION

This application is a division of application Ser. No. 10/002,012 filed Dec. 5, 2001 (now U.S. Pat. No. 7,118,484 issued Oct. 10, 2006).

This application claims the benefit of Japanese Patent Applications No. 2000-371934, 2001-219935, 2001-313941 and 2001-313945 which are hereby incorporated by reference.

BACKGROUND OF THE INVENTION

1. Field of the Invention

The present invention relates to a cross joint used for a steering apparatus for, e.g., a vehicle.

2. Related Background Art

In the steering apparatus for the vehicle, a cross joint constructed of a pair of yokes and a cross-shaped spider and serving to propagate a torque in a way that rotates a predetermined bending angle, is interposed between, for instance, an upper shaft and a lower shaft of a steering shaft.

According to a cross joint disclosed in, e.g., Japanese Patent Application Laid-Open No. 2000-170786, a shaft member of the spider is fitted into a bearing hole of a yoke through a needle bearing, such that said shaft member is capable of oscillating. A spherical protrusion formed on an axial core of an inner surface of a cup of the needle bearing is fitted into and kept in contact, by pressure, with a conical hole formed in the axial core of the spider shaft.

With this configuration, even when vibrations are propagated from wheels, a minute gap between the spider shaft and the needle bearing is kept uniform, thereby preventing an emission of noises due to an interference between the spider shaft and the needle bearing.

According to the structure disclosed in Patent Application Laid-Open No. 2000-170786, however, if a dimensional accuracy of each component is low, when the cross joint is assembled to the yokes, it is difficult to bring the spherical protrusion provided on the inner surface of the cup of the needle bearing into contact with the conical hole of the spider shaft with a proper pre-load. As a result, a minute gap between the spider shaft and the needle bearing can not be kept uniform, resulting in an emission of noises due to an interference therebetween.

On the other hand, if the dimensional accuracy of each component is enhanced, though capable of preventing the emission of noises, a rise in manufacturing cost is brought about as a negative aspect.

Further, when a steering shaft of the vehicle is steered, a steering wheel is rotated, with the result that the spider shaft is oscillated. An angle of this oscillation is determined by a joint fitting angle in the vehicle and is on the order of ±30 degrees in the case of an ordinary car. The rollers of the needle bearing smoothly rotate owing to the oscillations of the spider shaft.

According to Japanese Patent Application Laid-Open No. 2000-170786, however, the axial core of the roller is not parallel but inclined to the axis of the spider shaft in many cases, and the roller, with its rotation, moves in the axial direction within the cup of the needle bearing. With the movement of the roller in the axial direction, the roller comes into contact with the cup wall, and sliding contact occurs between the roller and the cup wall. As a result, a bending torque of the steering shaft increases, and a smooth feeling of steering can not be obtained.

SUMMARY OF THE INVENTION

It is a first object of the present invention, which was devised under such circumstances, to provide a cross joint capable of reliably preventing an emission of noises due to an interference between a spider shaft and a rolling bearing without causing any rise in manufacturing cost.

It is a second object of the present invention to provide a cross joint capable of reliably preventing the emission of noises due to the interference between the spider shaft and the rolling bearing and obtaining a smooth feeling by educing a bending torque of a steering shaft without bringing about any rise in manufacturing cost.

To accomplish the above objects, according to one aspect of the present invention, a cross joint comprises yokes each formed with a bearing hole, and a spider shaft rotatably fitted into the bearing hole through a rolling bearing. The spider shaft is formed with a contact portion with the rolling bearing, the contact portion having its outside diameter larger than an outside diameter of the spider shaft.

In the cross joint according to the present invention, preferably, an axial core side end surface of the contact portion is formed with a bottomed hole. Thus, according to the present invention, the contact portion of the spider shaft is set larger than that of the central portion thereof, and hence the fitting between this contact portion and the rolling bearing can be set to have an interference. Accordingly, even when vibrations are propagated from the wheels, the noises emitted due to the interference between the spider shaft and the rolling bearing can be reliably prevented by keeping uniform a minute gap between the central portion of the spider shaft and the rolling bearing.

On the other hand, the contact portion of the spider shaft has the bottomed hole at a central portion of the spider shaft end and is, in this case, formed in a comparatively thin ring shape. Hence, the contact portion has a comparatively small rigidity in its radial direction and, even when the fitting between the contact portion and the rolling bearing is set to have the interference, causes neither a large contact surface pressure nor a problem in terms of durability. Further, similarly, when assembling the cross joint to the yoke, a load for inserting (press-fitting) the rolling bearing (needle bearing) is relatively small, and there is no real difficulty with the assembly process. Moreover, there is no necessity of enhancing or improving a dimensional accuracy of each component, and the contact portion of the spider shaft is expanded in its diameter and is formed merely with the bottomed hole. This configuration does not bring about a rise in the manufacturing cost.

Moreover, the contact portion of the spider shaft is formed in a comparatively thin ring shape. Therefore, if a large load is propagated, the contact portion becomes flexural, however, the central portion of the spider shaft receives a large proportion of the load. Hence, there does not arise any significant problem in terms of strength.

Further, in the cross joint according to the present invention, an extreme-pressure additive may be added to a lubricating agent filling an interior of the needle bearing.

According to another aspect of the present invention, a cross joint comprises yokes each formed with a bearing hole, and a spider shaft fitted into the bearing hole through a needle bearing in a manner such that the shaft is capable of oscillating movement. The needle bearing is interference-fitted to the spider shaft, and rollers provided in a bearing cup of the needle bearing, and are so structured as to be movable 0.6 mm or larger in the axial direction.

Thus, according to the present invention, the needle bearing and the spider shaft are interference-fitted to each other, and it is therefore feasible to reliably prevent the emission of noises due to the interference between the spider shaft and the needle bearing without bringing about any rise in manufacturing cost.

In addition, the rollers in the bearing cup of the needle bearing are so structured as to be movable 0.6 mm or larger in the axial direction. Hence, even if the rollers rotate and move in the axial direction within the cup when the spider shaft is oscillated, the rollers do not come into contact with the cup wall, and no sliding contact between the rollers and the cup wall is experienced. Accordingly, it is possible to obtain the smooth feeling of steering by reducing the bending torque of the steering shaft.

DESCRIPTION OF THE PREFERRED EMBODIMENTS

First Embodiment

Figure 1:
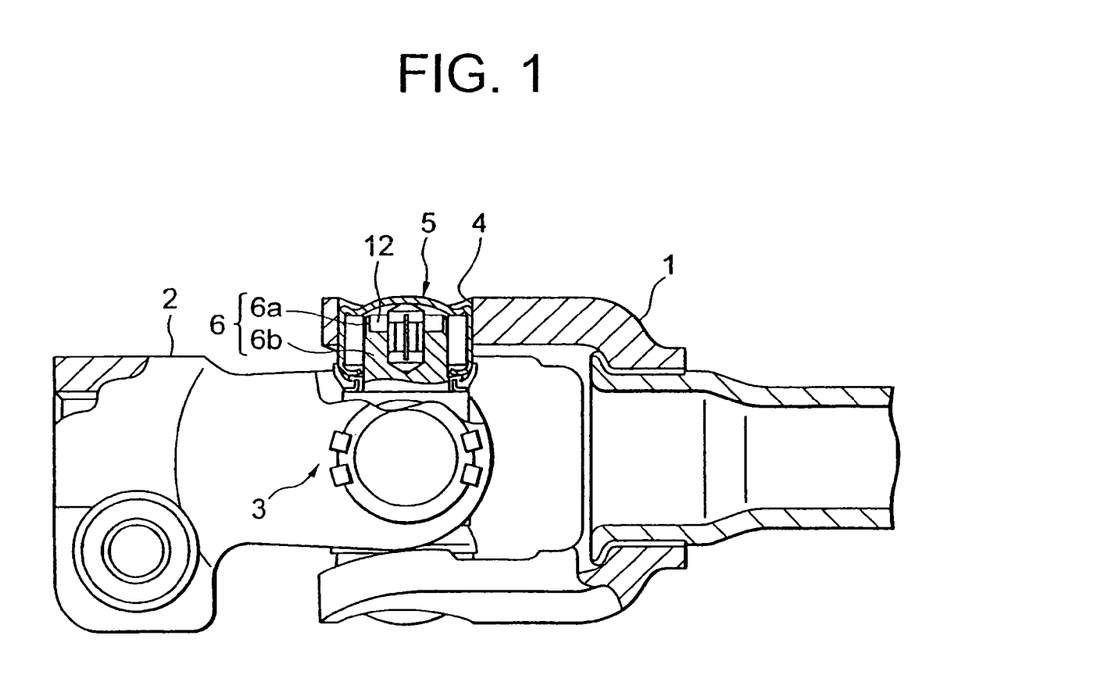
FIG. 1 is a side view including a partially cut-off section, showing a cross joint in a first embodiment of the present invention.
Figure 2:
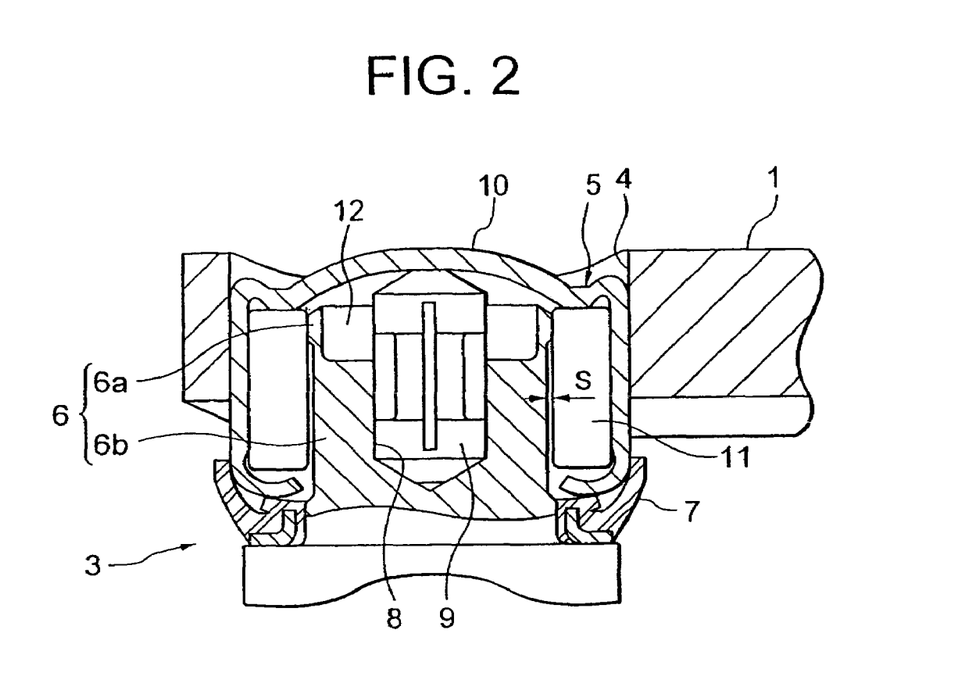
FIG. 2 is a sectional view of the cross joint shown in FIG. 1.

FIG. 1 is a side view including a partially cut-off section, showing a cross joint in a first embodiment of the present invention. FIG. 2 is a sectional view of the cross joint illustrated in FIG. 1.

As shown in FIG. 1, the cross joint has a cross-shaped spider 3 interposed between a pair of yokes 1 and 2. To be more specific, as shown in FIG. 2, a spider shaft 6 is rotatably fitted into a bearing hole 4 of the yoke 1 through a needle bearing 5. A seal member 7 is provided along an outer periphery of a lower portion of the spider shaft 6. The yoke may be manufactured by any one of sheet metal working, forging and casting and composed of any one of ferro-series and alumi-series materials.

Further, a pin 9 composed of a synthetic resin is inserted into an axial hole 8 formed in an axial core of the spider shaft 6. The needle bearing 5 is provided with a metallic cup 10 fitted in the bearing hole 4. A plurality of rolling members (rollers) 11 are arranged inwardly of this cup 10.

In the first embodiment, an outside diameter of a contact portion 6a of the spider shaft 6 is set larger than an outside diameter of a central portion 6b thereof, and a bottomed hole 12 is formed at a central portion of each end of the spider shaft 6.

Thus, the outside diameter of the contact portion 6a of the spider shaft 6 is set larger than that of the central portion 6b thereof, and hence the fitting between this contact portion 6a and the needle bearing 5 can be set to have an interference. Accordingly, even when vibrations are propagated from the wheels, noises emitted due to the interference between the spider shaft 6 and the needle bearing 5 can be reliably prevented by keeping uniform the minute gap S between the central portion 6b of the spider shaft 6 and the needle bearing 5.

On the other hand, since the contact portion 6a of the spider shaft 6 has the bottomed hole 12 at the central portion of the end of the spider shaft 6, the contact portion 6a is formed in a comparatively thin ring shape. Hence, the contact portion 6a has a comparatively small rigidity in its radial direction and, even when the fitting between the contact portion 6a and the needle bearing 5 is set to have the interference, causes neither a large contact surface pressure nor a problem in terms of durability. Further, similarly, when assembling the cross joint to the yoke 1, a load for inserting (press-fitting) the needle bearing 5 is relatively small, and there is no real difficulty with the assembly process.

Moreover, there is no necessity of enhancing a dimensional accuracy of each component, and the contact portion of the spider shaft 6 is expanded in its diameter and is formed merely with the bottomed hole 12. This configuration does not bring about a rise in the manufacturing cost.

Moreover, the contact portion 6a of the spider shaft 6 is formed in a comparatively thin ring shape. Therefore, if a large load is propagated, the contact portion 6a becomes flexural, however, the central portion 6b of the spider shaft 6 receives a large proportion of the load. Hence, there does not arise any significant problem in terms of strength.

Note that an axial diameter of the spider shaft is approximately 10 mm, a depth of the bottomed hole 12 is 1.8 through 3.5 mm and preferably 2 through 3 mm, a radial thickness of the thin ring-shaped portion of the contact portion 6a is 0.6 to 1.2 mm, and a level difference (that is, the minute gap S in FIG. 2 between the central portion 6b and the rolling member 11) is 0.004 to 0.020 mm. Note that the minute gap indicated by the symbol S is illustrated in exaggeration.

Further, a material of spider 3 is JIS chrome molybdenum steel material SCM420 or 421, or chrome steel material SCr420 or 430. Moreover, a thermal treatment of the spider 3 is an overall carburization quenching treatment, and preferably the bottomed hole 12 is prevented from being carburized. Further, the outside diametric portion of the spider shaft 6 is worked by grinding, and a chamfer portion of the side end surface is not ground. Moreover, the cross joint in the first embodiment is used mainly in an engine room for a vehicle.

Second Embodiment

Figure 3:
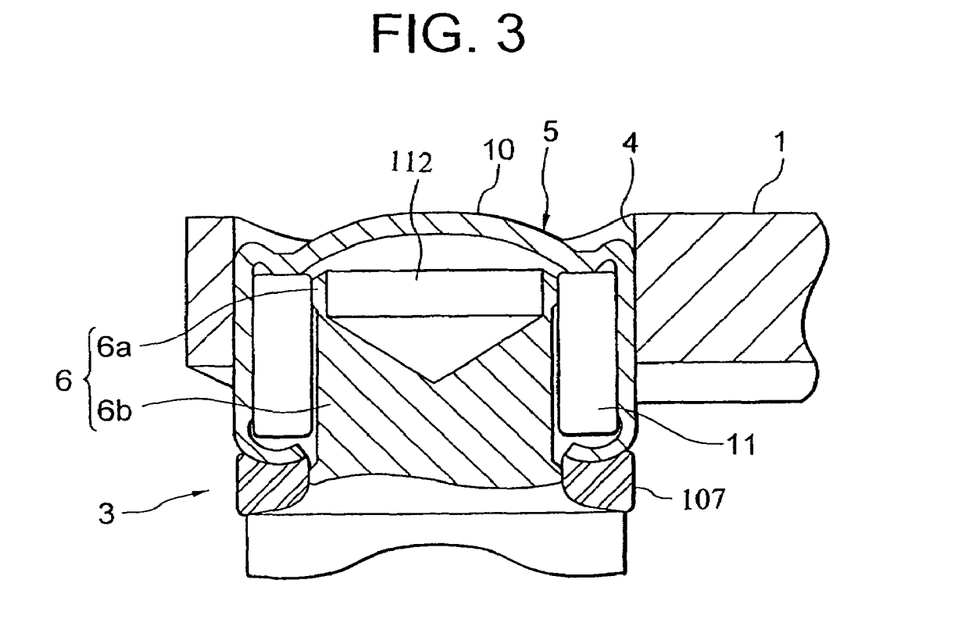
FIG. 3 is a sectional view of a cross joint shown in a second embodiment of the present invention.

FIG. 3 is a sectional view showing a cross joint in a second embodiment of the present invention. according to the second embodiment, the synthetic resin pin 9 is not provided, and therefore the bottomed hole 112 takes a conical shape, which leads to a less cost than in the first embodiment.

The cross joint in the second embodiment is, however, limited to the use in the driving room. Further, the seal member 107 is composed of a nitrile rubber. Other configurations and operations are the same as those in the first embodiment.

Third Embodiment

Figure 4:
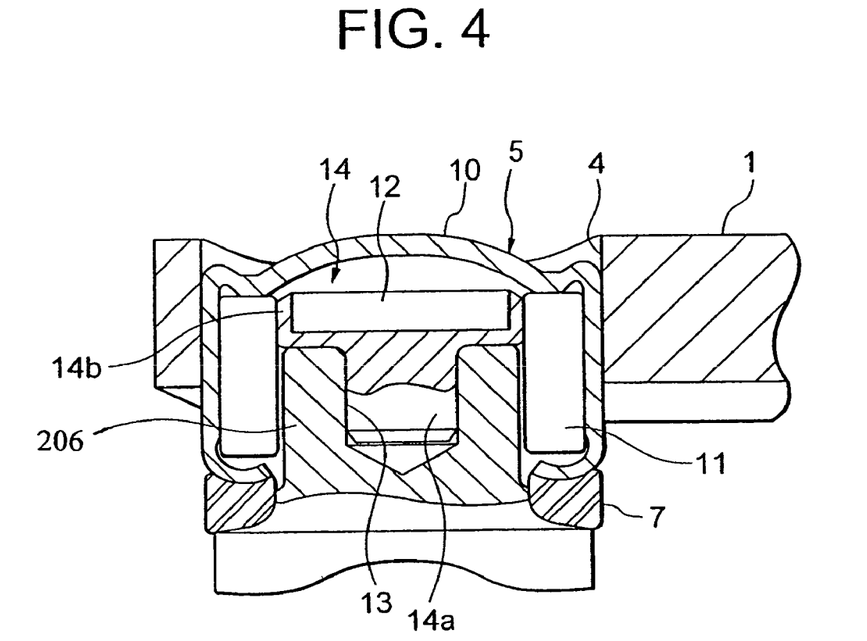
FIG. 4 is a sectional view of a cross joint shown in a third embodiment of the present invention.

FIG. 4 is a sectional view showing a cross joint in a third embodiment of the present invention. According to the third embodiment, the contact portion of the spider shaft is formed as a separate member. Namely, the spider shaft 206 is formed with an axial hole 13, and a separate spacer 14 is fitted into this axial hole 13.

A protrusion 14*a* of this spacer 14 is press-fitted into the axial hole 13, and a thin ring-shaped portion 14*b* of the spacer 14 functions as the contact portion 6*a* in the first and second embodiments does. According to the third embodiment, the grinding of the outside diametric portion of the spider is easier than in the first and second embodiments. Other configurations and operations are the same as those in the first embodiment.

Fourth Embodiment

Figure 5:
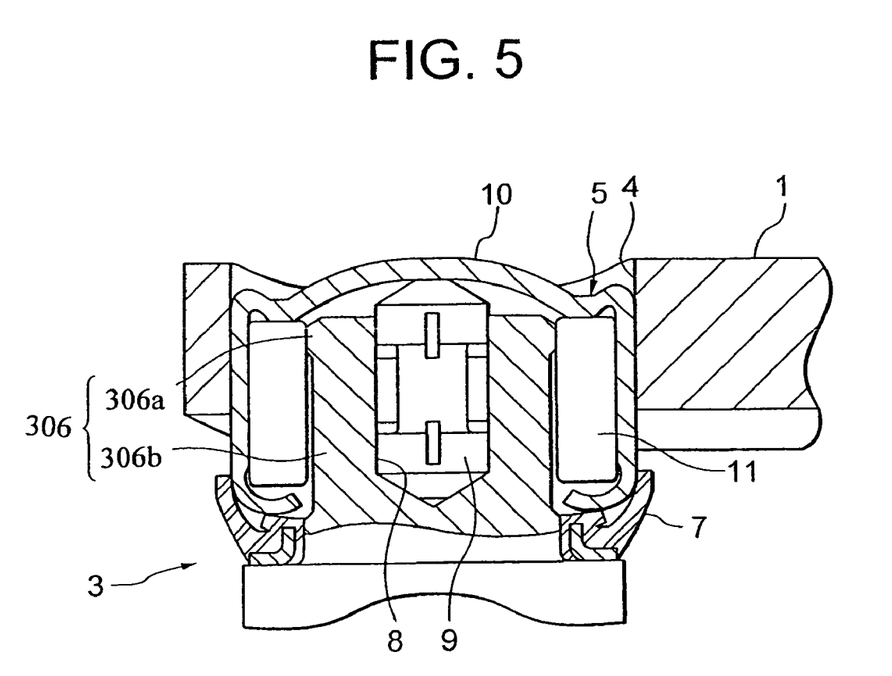
FIG. 5 is a sectional view of a cross joint shown in a fourth embodiment of the present invention.

FIG. 5 is a sectional view showing a cross joint in a fourth embodiment of the present invention. The fourth embodiment has such a configuration that a bottomed hole is not provided in contrast with the first embodiment.

Therefore, the working of the spider shaft 306, 306*a*, 306*b* becomes easier than in the first embodiment. The contact surface pressure with the needle bearing 5 is, however, higher than in the first embodiment, and hence there is a necessity of setting the interference with the needle bearing 5 smaller than in the first embodiment. Other configurations and operations are the same as those in the first embodiment.

Fifth Embodiment

Figure 6:
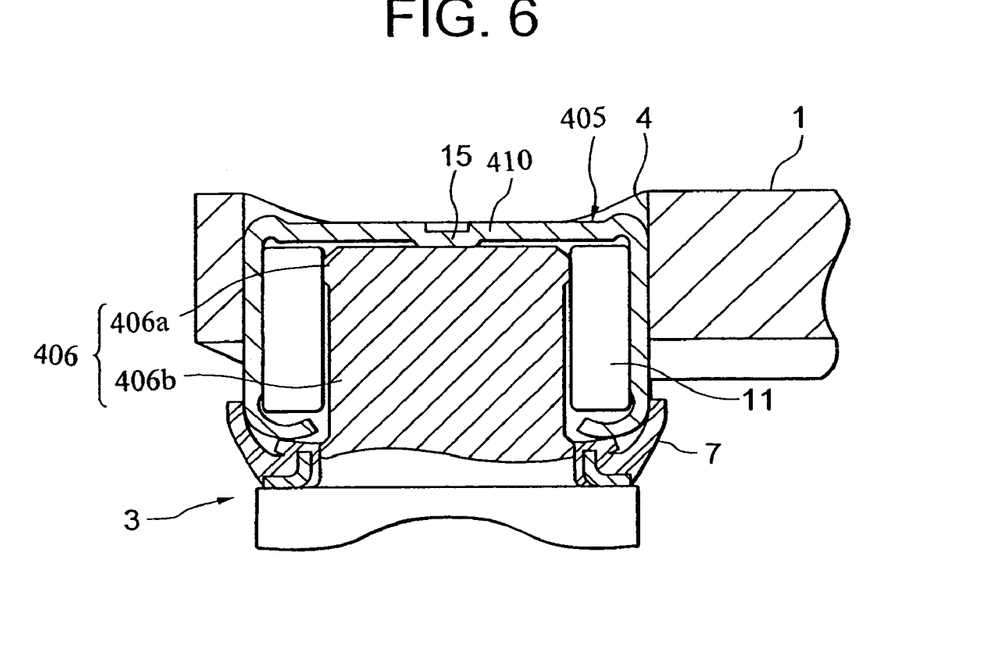
FIG. 6 is a sectional view of a cross joint shown in a fifth embodiment of the present invention.

FIG. 6 is a sectional view showing a cross joint in a fifth embodiment of the present invention. A configuration in the fifth embodiment is that, in contrast with the first embodiment, the spider shaft 406, 406*a*, 406*b* is not formed with an axial hole and is therefore solid, and a bottom central portion 15 of the cup 410 of the needle bearing 405 is brought into contact with a side end surface of the spider shaft 406.

Hence, the working of the spider shaft 406 is easier than in the first embodiment. The contact surface pressure with the needle bearing 405 is, however, higher than in the first embodiment, and hence there is a necessity of setting the interference with the needle bearing 405 smaller than in the first embodiment. Other configurations and operations are the same as those in the first embodiment.

Sixth Embodiment

Figure 7:
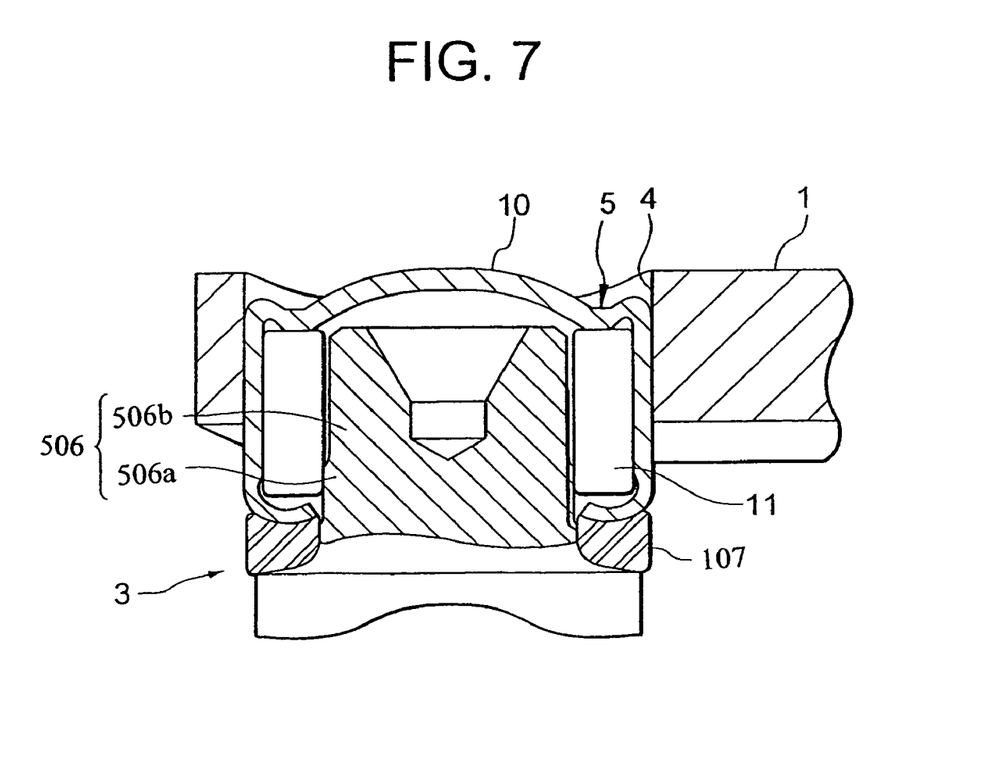
FIG. 7 is a sectional view of a cross joint shown in a sixth embodiment of the present invention.

FIG. 7 is a sectional view showing a cross joint in a sixth embodiment of the present invention. A configuration in the sixth embodiment is that an interference portion of the fitting between the needle bearing 5 and the contact portion 506*a* of the spider shaft 506 is set close to a proximal end of the spider shaft 506.

Hence, the working of the spider shaft 506 is easier than in the first embodiment. Other configurations and operations are the same as those in the first embodiment.

The contact portion 506*a* of the spider shaft 506 may be provided in an arbitrary position ranging extending from the front side end of the spider shaft 506 to its proximal end.

Seventh Embodiment

Figure 8:
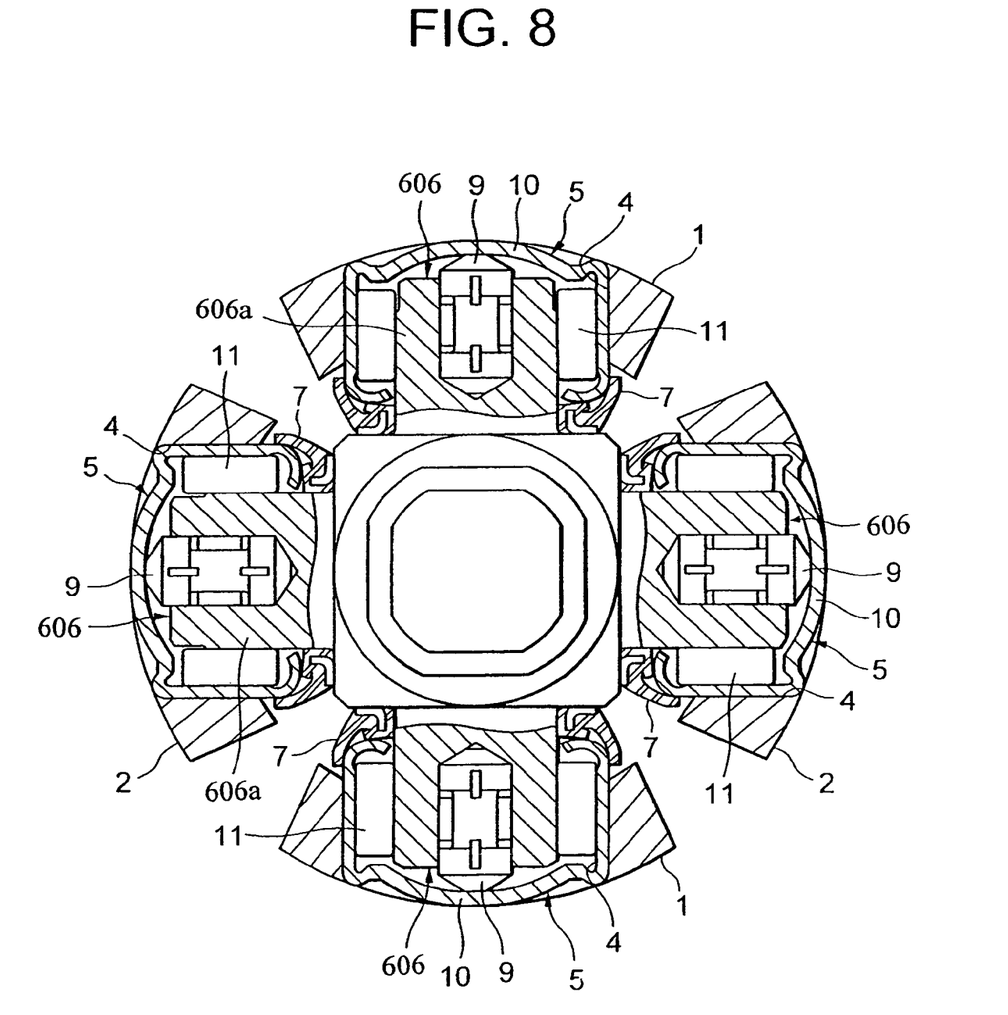
FIG. 8 is a sectional view (taken in the direction of a vertical axis of the center of the joint in FIG. 1) of a cross joint shown in a seventh embodiment of the present invention.

FIG. 8 is a sectional view (taken in a direction of the vertical axis of the center of the joint in FIG. 1) showing a cross joint in a seventh embodiment of the present invention. According to the seventh embodiment, one (an upper side in FIG. 8) of two pieces of spider shafts 606 facing to each other is interference-fitted, while the other (a lower side in FIG. 8) is loose-fitted.

One interference-fitted spider shaft 606 (the upper side in FIG. 8) has the contact (a large-diameter portion) 606*a* provided close to the proximal end thereof, and the distal end portion there is loose-fitted.

The other loose-fitted spider shaft 606 (the lower side in FIG. 8) has no stepped portion and is formed in a straight shape.

A spider shaft 606 orthogonal to the above spider shaft 606 has the same configuration. Other configurations and operations are the same as those in the first embodiment.

Note that the cost required in the seventh embodiment might be less than in the first through sixth embodiments, however, the noise preventive effect gets declined. Further, if four pieces of spider shafts 606 having the interference-fitted contact portions (large-diameter portions) 606*a* are reduced down to one single spider shaft 606, a still less cost can be expected, however, the noise preventive effect falls into a further decline.

Eighth Embodiment

Figure 9:
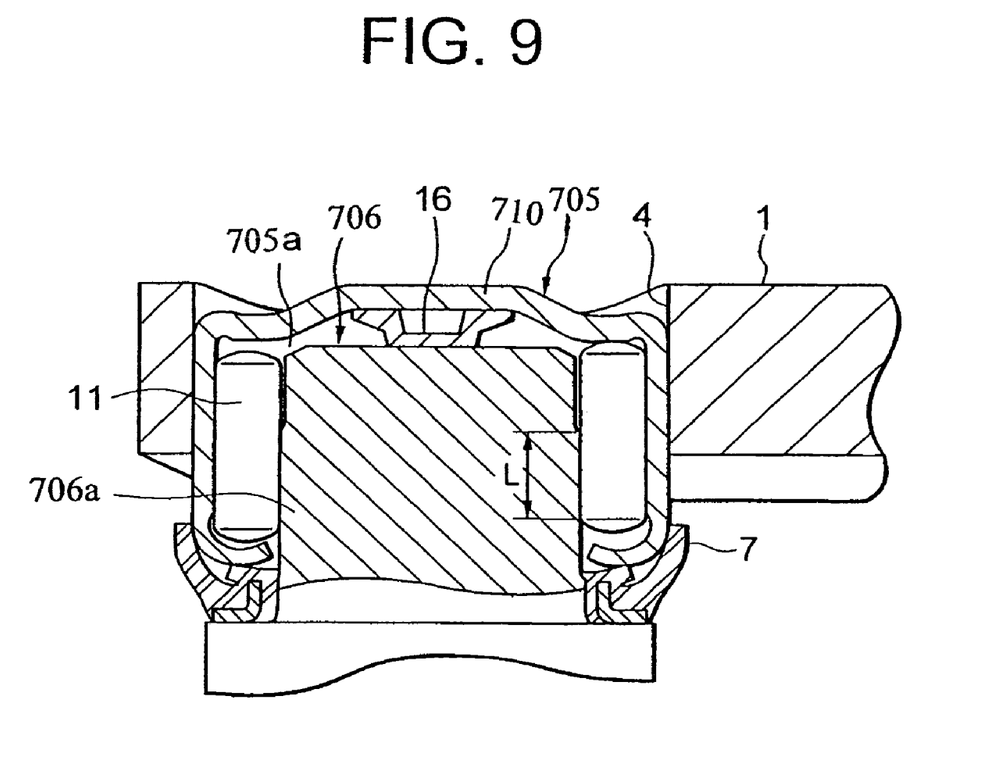
FIG. 9 is a sectional view of a cross joint shown in an eighth embodiment of the present invention.

FIG. 9 is a sectional view showing across joint in an eighth embodiment of the present invention. A configuration in the eighth embodiment is that the interference-fitted contact portion (large-diameter portion) 706*a* is provided at the proximal end of the spider shaft 706, a piece 16 is provided between the bottom surface of the cup 710 and the side end surface of the spider shaft 706. Other configurations and operations are the same as those in the first embodiment.

Note that a length (L) of the interference-fitted portion is set equal to or larger than 1.5 mm, preferably 2 mm on the basis of calculations and results of a multiplicity of tests performed. With this dimensional requirement attained, the durability can be ensured. Further, these numerical values are the same with the fourth through seventh embodiments.

Moreover, an outside diameter of the rolling member 11 is 1.4 to 2.3 mm, and the number of the rolling members 11 is 16 to 25. An outside diameter of the cup 10 is 15 to 16 mm. These numerical values are the same with the first through eighth embodiments.

Further, an extreme-pressure additive is added to grease (lubricating oil) filling an internal space 705*a* of the needle bearing 705. This addition enables a bending torque can be further decreased. The specific extreme-pressure additives may be exemplified as follows:

Disulfide molybdenum

Sulfur-series (S) extreme-pressure additives

Sulfur-phosphorus-series (S—P) extreme-pressure additives

Zinc-sulfur-phosphorus-series (Zn—S—P) extreme-pressure additives.

It is to be noted that this grease may be used in other embodiments.

As discussed above, according to the first through eighth embodiments of the present invention, the contact portion of the spider shaft sets its outside diameter larger than the outside diameter of the central portion thereof, and hence the fitting between this contact portion and the rolling bearing can be set to have the interference. Accordingly, even when the vibrations are propagated, the noises emitted due to the interference therebetween can be reliably prevented by keeping uniform a minute gap between the central portion of the spider shaft and the rolling bearing.

On the other hand, the contact portion of the spider shaft has the bottomed hole formed in the axial core side end surface thereof and therefore takes on a comparatively thin ring shape. Accordingly, the contact portion is relatively small in its rigidity in the radial direction thereof and, even when the fitting between the contact portion and the rolling bearing is set to have the interference, causes neither a large contact surface pressure nor a problem in terms of durability. Further, similarly, when assembling the cross joint to the yoke, the load for inserting (press-fitting) the rolling bearing (the needle bearing) is relatively small, and there is no real difficulty with the assembly process.

Moreover, there is no necessity of enhancing or improving the dimensional accuracy of each component, the contact portion of the spider shaft is expanded in its diameter and is formed merely with the bottomed hole. This configuration does not bring about a rise in the manufacturing cost.

Moreover, the contact portion of the spider shaft is, as described above, formed in a comparatively thin ring shape. Therefore, if a large load is propagated, the contact portion becomes flexural, however, the central portion of the spider shaft receives the large proportion of the load. Hence, there does not arise the problem in terms of the strength.

Ninth Embodiment

Figure 10A:
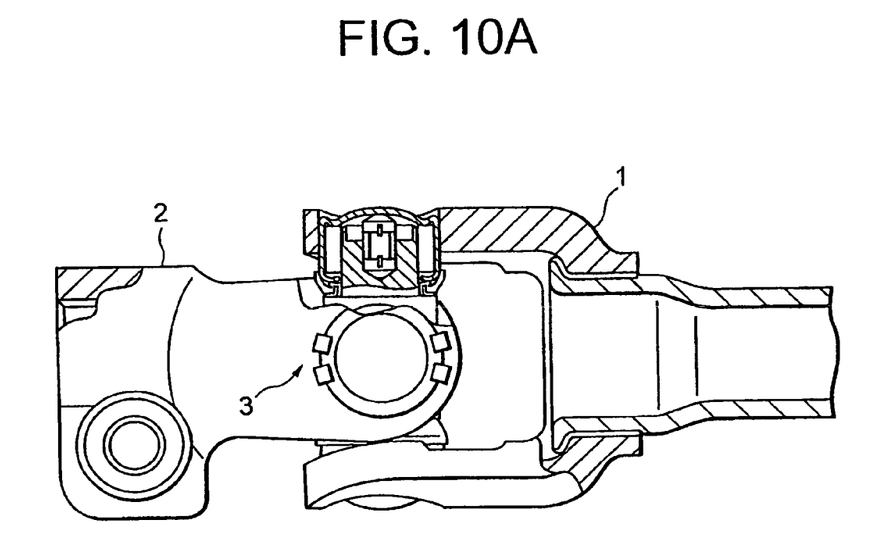
FIG. 10A is a side view including a partially cut-off section, showing a cross joint shown in a ninth embodiment of the present invention.
Figure 10B:
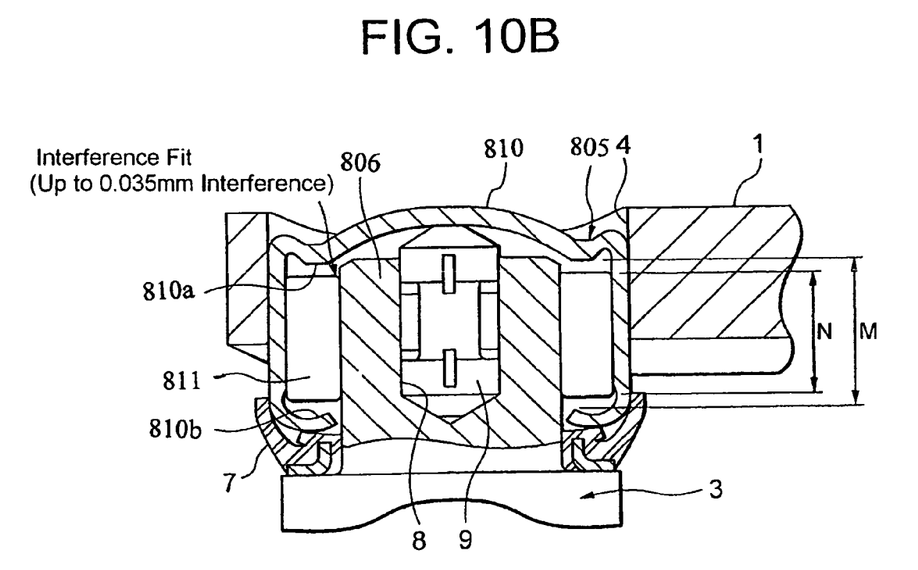
FIG. 10B is a sectional view of the cross joint shown in FIG. 10A.

FIG. 10A is a side view including a partially cut-off section, showing a cross joint in a ninth embodiment of the present invention. FIG. 10B is a sectional view of the cross joint illustrated in FIG. 10A.

As shown in FIG. 10A, the cross joint has the cross-shaped spider 3 is interposed between the pair of yokes 1 and 2. To be more specific, as shown in FIG. 10B, the spider shaft 806 is fitted into the bearing hole 4 of the yoke 1 through the needle bearing 805 in a manner such that it is capable of oscillating movement. The seal member 7 is provided along the outer periphery of the lower portion of the spider shaft 806. The yoke may be manufactured by any one of sheet metal working, forging and casting and composed of any one of ferro-series and alumi-series materials in the ninth embodiment and other embodiments which follow.

The pin 9 composed of the synthetic resin is inserted into the axial hole 8 formed in the axial core of the spider shaft 806. The needle bearing 805 is provided with the metallic bearing cup 810 fitted in the bearing hole 4. The plurality of rolling members (rollers) 811 are arranged inwardly of this cup 810.

In the case of taking the conventional gap-fitting between the spider shaft 806 and the needle bearing 805, noises occur during the traveling of the vehicle.

The ninth embodiment takes the interference-fitting between the needle bearing 805 and the spider shaft 806, and hence the emission of the noises due to the interference between the spider shaft 806 and the needle bearing 805 can be surely prevented without bringing about the rise in the manufacturing cost. The interference is set to 0 through 0.035 mm and preferably 0.002 to 0.025 mm.

The needle bearing 805 is classified as an overall roller type, an outside diameter of the cup 810 is approximately 15 to 16 mm, an inscribed circle diameter of the roller 811 is on the order of 10 mm, an outside diameter of the roller 811 is 1.4 through 2.3 mm, and the number of rollers 811 is 16 to 25.

When a steering shaft of the vehicle is steered, a steering wheel (unillustrated) is rotated, with the result that the spider shaft 806 is oscillated. An angle of this oscillation is determined by a joint fitting angle in the vehicle and is on the order of ±30 degrees in the case of an ordinary car.

The roller 811 smoothly rotates owing to the oscillations of the spider shaft 806. However, the axial core of the roller 811 is not parallel but inclined to the axis of the spider shaft 806 in many cases, and the roller 811, with its rotation, moves in the axial direction within the cup 810.

The inclination of the roller 811 occurs in the case of the interference fitting as a result of testing and is substantially fixed depending on a gap in the peripheral direction between the rollers 811. In the ninth embodiment, this gap in the peripheral gap is 0.05 through 0.21 mm.

In the case of a conventional steering joint, when the oscillations are caused, the rollers 811 would ordinarily move in the axial direction and come into contact with either walls 810a, 810b of the cup 810, and sliding would occur between the rollers 811 and the walls 810a, 810b of the cup 810. Further, sliding in the axial direction would occur between the rollers 811 and the spider shaft 806, whereby the bending torque would increase (resistance increases when oscillated). Especially when the fitting gap is negative (interference), this tendency becomes conspicuous.

According to the ninth embodiment, a gap (M-N) in the roller axial direction within the cup 810 is set to 0.6 mm or larger. This gap (M-N) is determined from result of a multiplicity of tests and is preferably 0.9 mm or greater. Namely, the roller within the bearing cup of the needle bearing is so structured as to be movable 0.6 mm or larger in the axial direction. As a result, when the joint is bent, the rollers 811 rotate and move in the axial direction within the cup 810 with the oscillations of the spider shaft 806. Even in such a case, the walls 810a, 810b of the cup 810 have neither the contact of the rollers 811 nor sliding with respect to the rollers. Accordingly, a smooth feeling of the steering can be obtained by reducing the bending torque of the steering shaft.

There might be a case where the rollers 811 have already been brought into contact with the walls 810a, 810b of the cup 810 after the assembly, or a case where the rollers reside in the vicinity of the walls 810a, 810b. In this case, with the joint bent, the rollers 811 are once brought into contact with the walls 810a, 810b, and the bending torque increases. When the joint gets resilient from the bending state, however, the rollers 811 become separate from the walls 810a, 810b and move in the opposite direction (i.e., in the central direction) owing to inclinations of the rollers 811. Next, even when bent in the same direction as done for the first time, a bending angle thereof is kept till the rollers 811 come into contact with the walls 810a, 810b of the cup 810, and therefore the bending torque does not increase.

Tenth Embodiment

Figure 11:
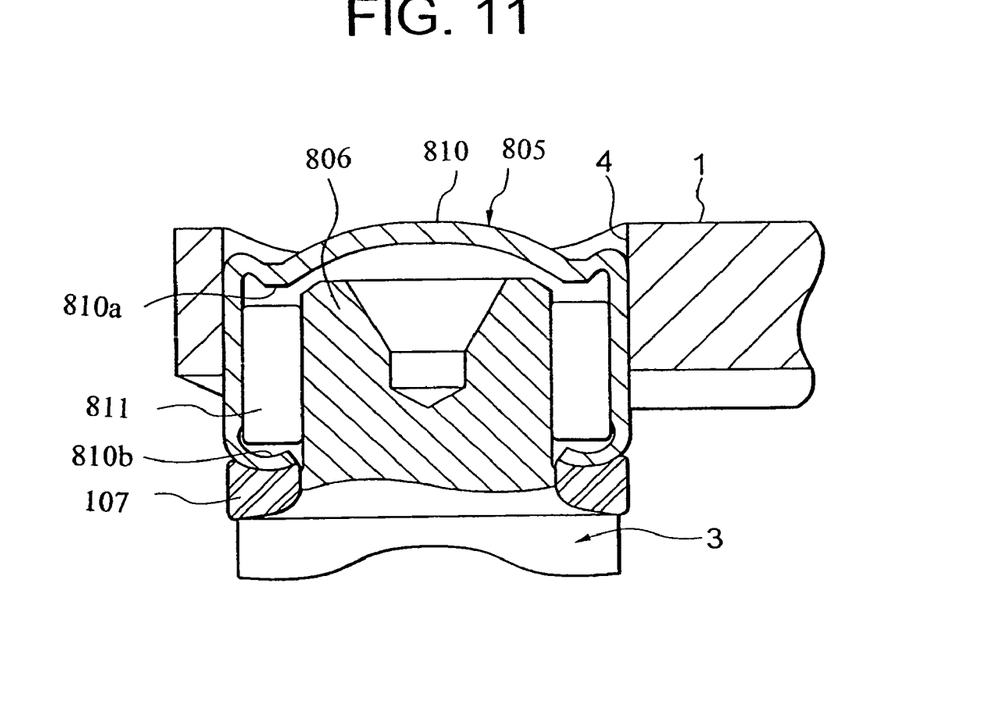
FIG. 11 is a sectional view of a cross joint shown in a tenth embodiment of the present invention.

FIG. 11 is a sectional view showing a cross joint in a tenth embodiment of the present invention. The tenth embodiment does not involve the use of the synthetic resin pin. Other configurations and operations are the same as those in the ninth embodiment.

Eleventh Embodiment

Figure 12:
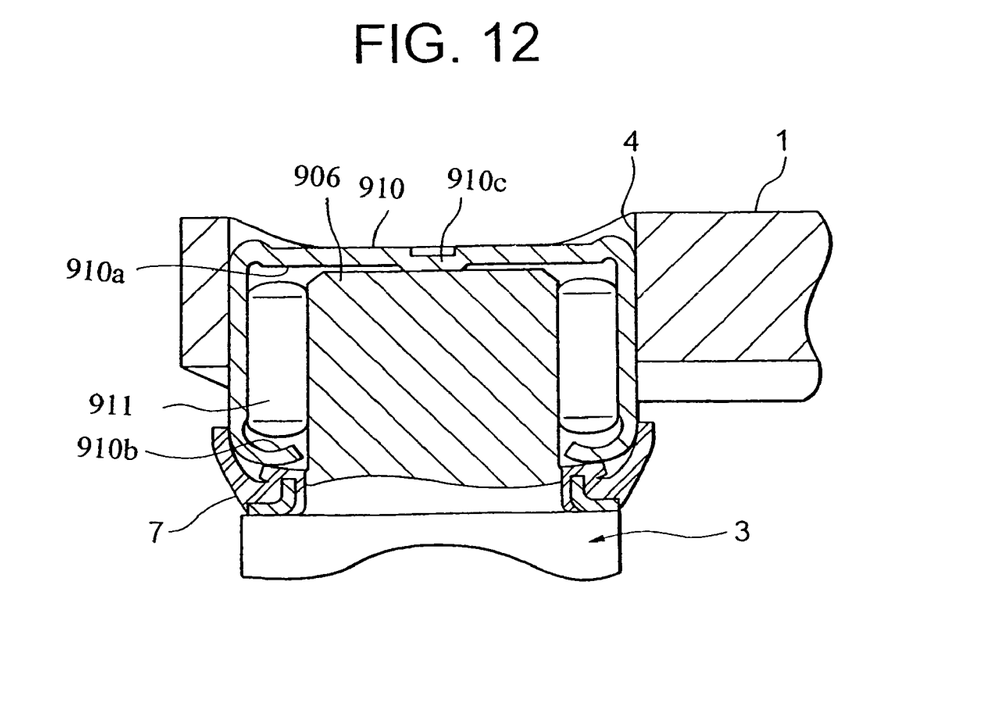
FIG. 12 is a sectional view of a cross joint shown in an eleventh embodiment of the present invention.

FIG. 12 is a sectional view showing a cross joint in an eleventh embodiment of the present invention. According to the eleventh embodiment, a bottom wall of the cup 910, 910a, 910b is formed with a protrusion 910c coming into contact with the side end surface of the spider shaft 906. Further, the side end surface of the roller 911 in the bearing is spherical. Other configurations and operations are the same as those in the ninth embodiment.

Twelfth Embodiment

Figure 13A:
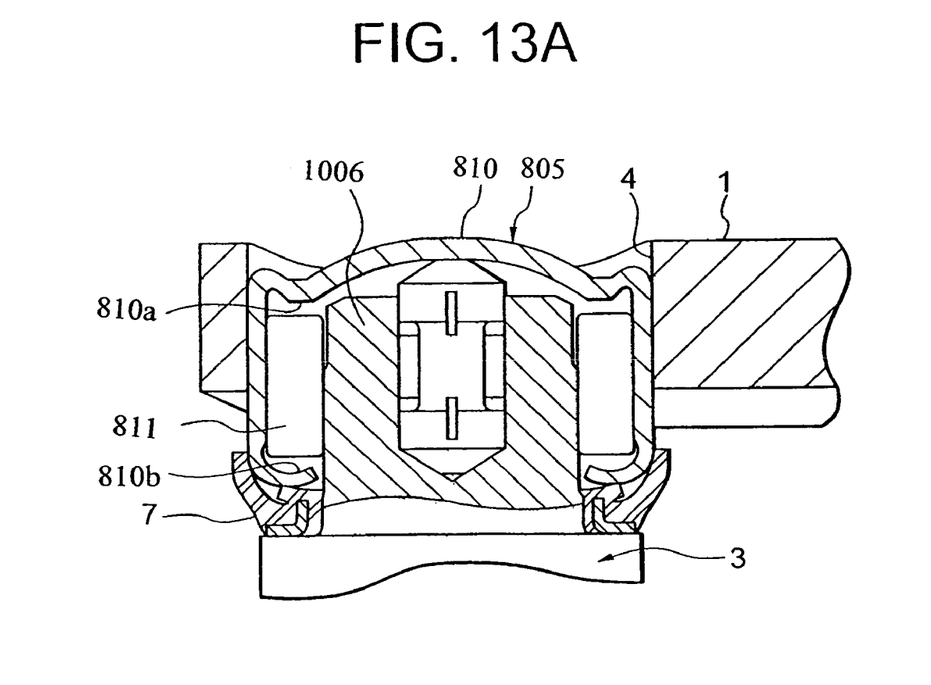
FIGS. 13A and 13B are sectional views each showing a cross joint shown in a twelfth embodiment of the present invention.
Figure 13B:
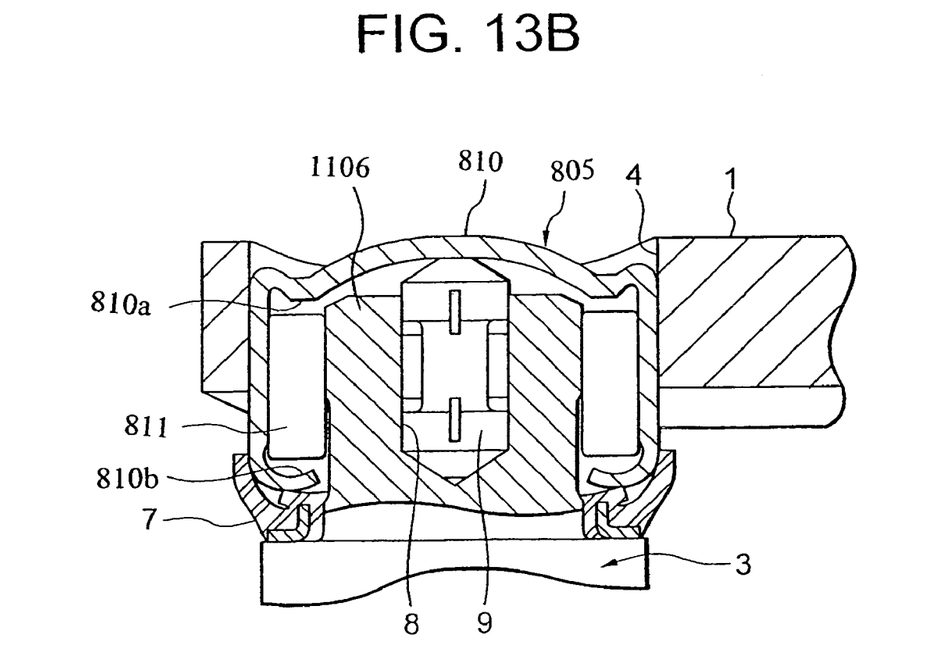

FIGS. 13A and 13B are sectional views each showing a cross joint in a twelfth embodiment of the present invention. According to the twelfth embodiment, the spider shaft 1006 has a stepped portion, and a length of the contact with the roller 11 is set short. Namely, an end-side major diameter of the spider shaft 1006 is set small in FIG. 13A, and a proximal-side major diameter of the spider shaft 1106 is set small in FIG. 13B. With these settings, when the bearing is assembled, a press-fitting load thereof becomes small because of the short contact length with the spider shaft, thereby facilitating the assembly. Other configurations and operations are the same as those in the ninth embodiment.

Thirteenth Embodiment

Figure 14A:
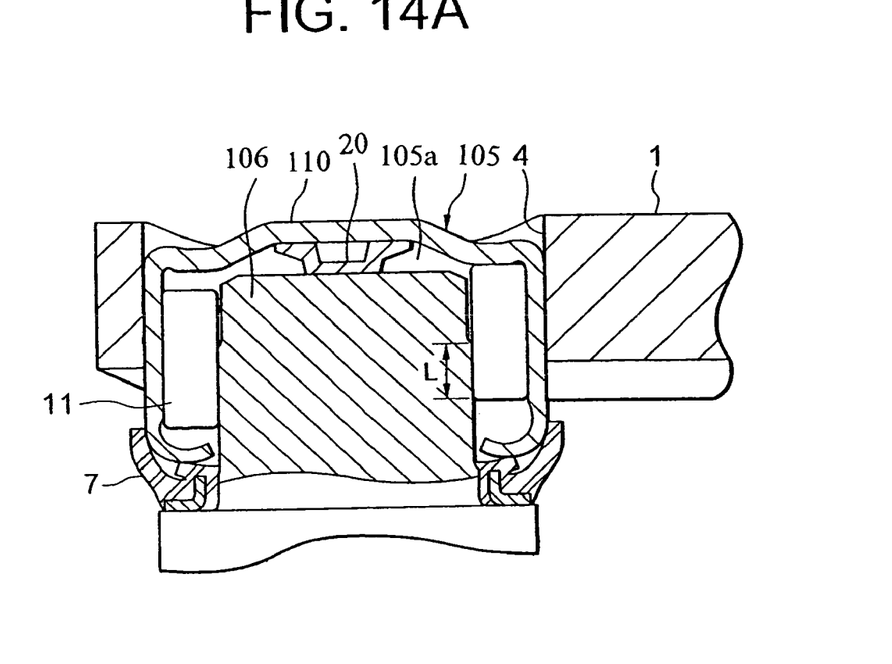
FIG. 14A is a sectional view of a cross joint in a thirteenth embodiment of the present invention.

FIG. 14A is a sectional view showing a cross joint in a thirteenth embodiment of the present invention. In the thirteenth embodiment, a piece 20 composed of the synthetic resin is used as a substitute for the synthetic resin pin 9. That is, the piece 20 is provided between the bottom surface of the cup 110 and the side end surface of the spider shaft 106. Other configurations and operations are the same as those in the ninth embodiment.

Further, the extreme-pressure additive is added to the grease (lubricating oil) filling the internal space 105a of the needle bearing 105. This addition enables the bending torque can be further decreased. The specific extreme-pressure additives may be exemplified as follows:

Disulfide molybdenum

Sulfur-series (S) extreme-pressure additives

Sulfur-phosphorus-series (S—P) extreme-pressure additives

Zinc-sulfur-phosphorus-series (Zn—S—P) extreme-pressure additives.

It is to be noted that this grease may be used in other embodiments. Moreover, the length (L) of the interference-fitted portion is set equal to or larger than 1.5 mm, preferably 2 mm on the basis of calculations and results of a multiplicity of tests performed. With this dimensional requirement attained, the durability can be ensured.

Fourteenth Embodiment

Figure 14B:
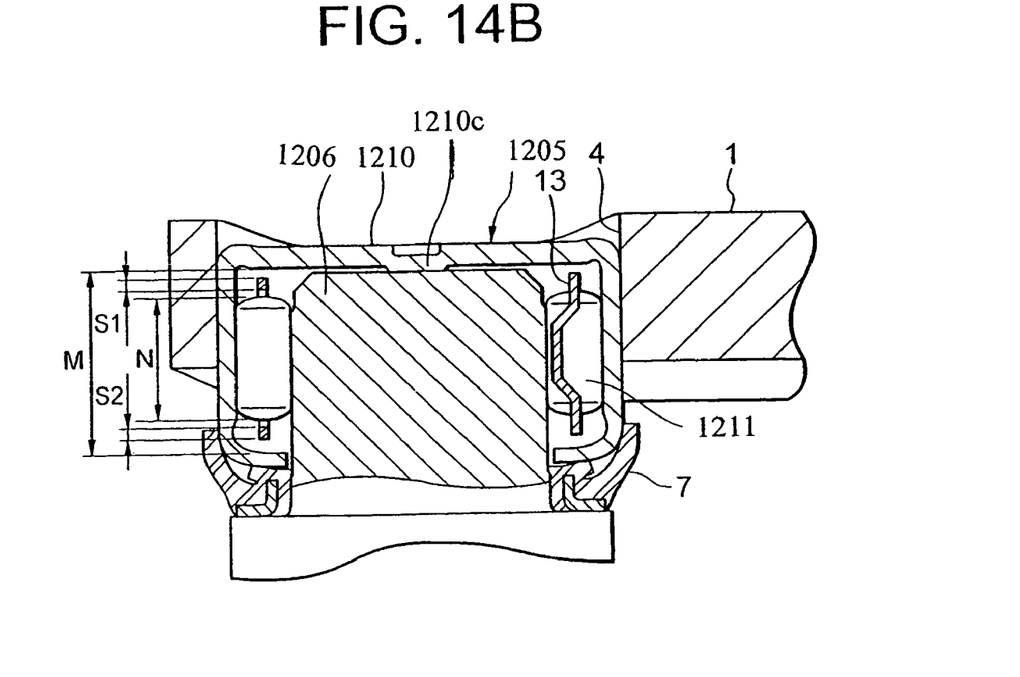
FIG. 14B is a sectional view of a cross joint in a fourteenth embodiment of the present invention.

FIG. 14B is a sectional view showing a cross joint in a fourteenth embodiment of the present invention. In accordance with the fourteenth embodiment, the needle bearing 1205 is provided with a cage 13. In this case, the following relationship is established.

$$M-N-S1-S2 \geq 0.6 \text{ mm}$$

According to the fourteenth embodiment, the needle bearing 1205 is provided with the cage 13, and consequently the cost is higher than in other embodiments that do not involve the use of the cage. The rollers 1211 are, however, inclined without no relation with each other and therefore have a less possibility of their being tilted in one direction as in the overall roller type. Hence, a force by which the spider shaft 1206 moves in the axial direction is small, and an anti-abrasion of the contact portion between the protrusion 1210c on the bottom wall of the cup 1210 and the side end surface of the spider shaft 1206, is enhanced.

The ninth through fourteenth embodiments involve the use of the shell type needle bearing and may also involve the use of a solid type needle bearing. Further, two shafts facing to each other may take the shell type needle bearing, and the two shafts substantially orthogonal thereto may take the solid type needle bearing.

What is claimed is:

1. A cross joint comprising:

yokes each formed with a bearing hole; and a spider shaft rotatably fitted into said bearing hole of one of said yokes through a rolling bearing including a rolling member having a cylindrical outer surface, wherein said spider shaft is formed with a contact portion in contact with a lengthwise portion of the cylindrical outer surface of said rolling member, said contact portion having an outside diameter larger than an outside diameter of an adjacent portion of said spider shaft, and a central portion of an end of said spider shaft is formed with a bottomed hole.

2. A cross joint according to claim 1, wherein a pressure-withstanding additive is added to a lubricating agent filling an interior of said rolling bearing.

3. A cross joint according to claim 1, wherein said rolling bearing is interference-fitted on the contact portion of said spider shaft.

4. A cross joint according to claim 1, wherein said cylindrical outer surface includes a first lengthwise portion contacting said contact portion of said spider shaft and a second lengthwise portion disposed with a radial clearance to said spider shaft.

5. A cross joint according to claim 4, wherein said rolling bearing is interference-fitted on the contact portion of said spider shaft.

6. A cross joint according to claim 1, wherein said contact portion is formed on a distal end portion of said spider shaft.

7. A cross joint according to claim 1, wherein said spider shaft is rotatably fitted into said bearing hole of one of said yokes through said rolling bearing and a bearing cup.

8. A cross joint according to claim 7, wherein a resin member is inserted into said bottomed hole so as to be in contact with a bottom surface of the bearing cup.

9. A cross joint comprising:

yokes each formed with a bearing hole; and a spider shaft rotatably fitted into said bearing hole of one of said yokes through a rolling bearing including a rolling member having a cylindrical outer surface, wherein said spider shaft has an annular distal end portion including a contact portion in contact with a lengthwise portion of the cylindrical outer surface of said rolling member, said contact portion being of enlarged outer diameter relative to that of an intermediate portion of said spider shaft.

10. A cross joint according to claim 9, wherein said intermediate portion of said spider shaft is annular, with a wall thickness greater than a wall thickness of said end portion.

11. A cross joint according to claim 10, wherein said cylindrical outer surface includes a first lengthwise portion contacting said contact portion of said spider shaft and a second lengthwise portion disposed with a radial clearance to said spider shaft.

12. A cross joint according to claim 11, wherein said rolling bearing is interference-fitted on said contact portion of said spider shaft.

13. A cross joint according to claim 9, wherein said cylindrical outer surface includes a first lengthwise portion contacting said contact portion of said spider shaft and a second lengthwise portion disposed with a radial clearance to said spider shaft.

14. A cross joint according to claim 13, wherein said rolling bearing is interference-fitted on said contact portion of said spider shaft.

15. A cross joint according to claim 9, wherein said spider shaft is rotatably fitted into said bearing hole of one of said yokes through said rolling bearing and a bearing cup.

16. A cross joint according to claim 15, wherein a central portion of an end of said spider shaft is formed with a bottomed hole in which a resin member is inserted so as to be in contact with a bottom surface of the bearing cup.

17. A cross joint according to claim 9, wherein said intermediate portion of said spider shaft is located axially adjacent to said end portion.

18. A cross joint comprising:
yokes each formed with a bearing hole; and
a spider shaft rotatably fitted into said bearing hole of one of said yokes through a rolling bearing,
wherein said spider shaft has a bearing contact portion of enlarged outer diameter relative to that of an axially adjacent portion of said spider shaft,
said rolling bearing is interference-fitted on said bearing contact portion of said spider shaft, and
said rolling bearing includes a rolling member having a cylindrical outer surface with a first lengthwise portion contacting said bearing contact portion of said spider shaft and a second lengthwise portion disposed with a radial clearance to said spider shaft.

19. A cross joint according to claim 18, wherein said bearing contact portion is formed on a distal end portion of said spider shaft.

20. A cross joint according to claim 18, wherein said spider shaft is rotatably fitted into said bearing hole of one of said yokes through said rolling bearing and a bearing cup.

21. A cross joint according to claim 20, wherein a central portion of an end of said spider shaft is formed with a bottomed hole in which a resin member is inserted so as to be in contact with a bottom surface of the bearing cup.

* * * * *